United States Patent

Erickson

[15] 3,648,623
[45] Mar. 14, 1972

[54] LOAD DIVIDING GATE WITH RELEASE MECHANISM

[72] Inventor: John W. Erickson, Huntington Beach, Calif.

[73] Assignee: Preco Inc., Los Angeles, Calif.

[22] Filed: Nov. 25, 1970

[21] Appl. No.: 92,715

[52] U.S. Cl. ...........................................................105/376
[51] Int. Cl. .........................................................B60p 7/14
[58] Field of Search ................................................105/376

[56] References Cited

UNITED STATES PATENTS

| | | | |
|---|---|---|---|
| 3,168,055 | 2/1965 | Vander Hyde et al. | 105/376 |
| 3,330,584 | 7/1967 | Kuellmar | 105/376 |
| 3,570,416 | 3/1971 | Shook | 105/376 |
| 3,593,674 | 7/1971 | Winterfeldt | 105/376 |

Primary Examiner—Drayton E. Hoffman
Attorney—Charlton M. Lewis

[57] ABSTRACT

In load dividing gates with conventional mechanism for operating the locking pins, the load sometimes exerts such extreme lateral force on the gate that the pins cannot be withdrawn to release the gate. The present mechanism provides one or more arcuate toothed racks on the pin operating crankshaft, with a fixedly mounted fulcrum edge spaced radially from the rack by a distance of the same order as the tooth pitch. A conventional crowbar can then exert extremely high torque on the crankshaft, acting on successive teeth to rotate the shaft progressively until the pins are released. The rack teeth are preferably formed directly on the crank member of the coupling linkage.

5 Claims, 3 Drawing Figures

Patented March 14, 1972
3,648,623
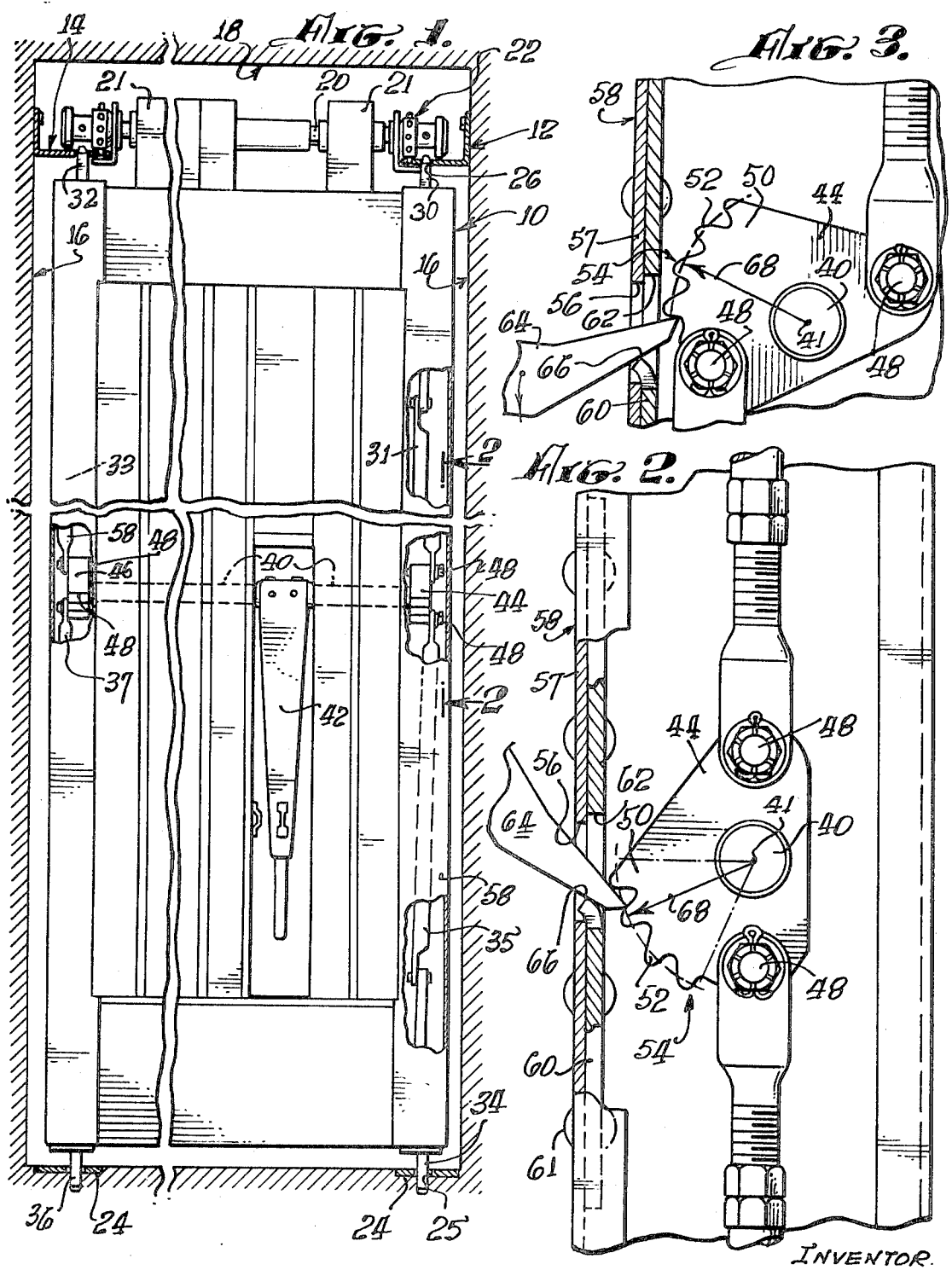
INVENTOR.
JOHN W. ERICKSON,
By Charlton M. Lewis

LOAD DIVIDING GATE WITH RELEASE MECHANISM

This invention has to do with load dividing gates which are suspended for movement longitudinally of a vehicle lading compartment between a series of working positions, and which include locking mechanism which is manually actuable to releasably lock the gate in a selected position. The invention concerns more particularly means for reliably releasing the locking mechanism if it should become jammed for any reason in gate locking condition.

Load dividing gates of the described type are normally locked in working position by four locking pins which are mounted at the respective corners of the gate for vertical movement into and out of engagement with locking apertures in respective rail structures mounted in the lading compartment. Such locking pins are normally connected by pivoted links to crank members mounted on a horizontal operating shaft journaled within the gate. An operating handle mounted on the shaft produces sufficient leverage to operate all four locking pins simultaneously under most normal working conditions. However, the load that is restrained by the gate may shift during transit of the vehicle in such a way as to exert a very high lateral force upon the gate. The resulting side thrust upon the locking pins, which may be many thousand pounds for each pin, produces frictional resistance to the vertical movement of the pins. Such lateral force from the load occasionally makes it impossible to release the gate by operation of the normal handle. Unless effective provision is made for meeting such an emergency there can be serious delay in obtaining access to the load, and the gate may be damaged by attempts to release it.

Several mechanisms have been proposed for releasing gates which are subject to extreme lateral force, but such previous mechanisms tend to be complex and expensive, and have not been fully satisfactory in operation.

The present invention provides extremely simple and economical mechanism for manually exerting remarkably high forces on the locking pins of a load dividing gate in a direction to release the gate even under extreme conditions of lateral load. That mechanism comprises an arcuate rack formation fixedly mounted coaxially on the operating shaft of the gate, and structure forming a fixed fulcrum edge in suitable position relative to the rack for prying action by a suitable manual tool such as a conventional crowbar.

It has been found that rack teeth for the described purpose can be formed directly on the crank member by which the locking pins are normally coupled to the operating shaft, and that the radius of the rack formation may be sufficiently small to fit comfortably within the thickness of a conventional load dividing gate. Moreover, the radius of the rack may be such that the fulcrum edge can conveniently be formed on a plate member that is mounted directly on the gate structure and essentially flush with a face of the gate. In preferred form of the invention, the fulcrum edge is formed along the lower edge of a rectangular aperture in a plate which is mounted immediately inside the gate face. The side edges of the gate normally comprise channel members having flanges lying essentially in the side faces of the gate, and such flanges provide a convenient and sturdy support for the described fulcrum plate.

A particular advantage of the present structure is that a plurality of rack teeth may be provided, with a tooth pitch approximately equal to the spacing of the fulcrum from the rack. Successive prying actions can then progressively rotate the rack through whatever angle is required about the shaft to insure full release of the locking pins. With that structure the spacing of the fulcrum from the pitch radius of the teeth may be made small enough to produce substantially any desired leverage in the prying action. It has been found in practice that a fulcrum distance of the order of one-half inch ordinarily gives fully adequate force on the rack while requiring only a moderate number of teeth for producing the required angular movement.

A full understanding of the invention and of its further objects and advantages will be had from the following description of a particular manner of carrying it out. The particulars of that description, and of the accompanying drawings which form a part of it, are intended only as illustration and not as a limitation upon the scope of the invention.

In the drawings:

FIG. 1 is a fragmentary elevation of a load dividing gate mounted in a lading compartment represented in transverse section;

FIG. 2 is a section on enlarged scale on line 2—2 of FIG. 1 and showing the mechanism in locked position; and FIG. 3 is a section corresponding to FIG. 2 and showing the mechanism in substantially released position.

Referring first to FIG. 1, an illustrative load dividing gate is indicated at 10, only the four corner areas of the gate being explicitly shown for clarity of illustration. The gate is suspended from the two parallel horizontal rails 12 and 14, which are secured to the side walls 16 of the load dividing compartment close to the ceiling 18. A supporting shaft 20 is journaled on the gate by bearing structures 21 and carries the sprocket wheels 22 in fixed rotative relation at its ends. Those sprocket wheels ride the lower flanges of rails 12 and 14, with the sprocket teeth engaging apertures in the rail flange to maintain the gate perpendicular to the longitudinal axis of the lading compartment. The locking pins 30 and 32 at the upper corners of the gate and pins 34 and 36 at the lower corners of the gate are mounted on the gate structure for vertical sliding movement in conventional manner. Those pins are controlled by the operating shaft 40, to which they are coupled by the links 31, 33, 35 and 37, and the crank members 44 and 46. Shaft 40 is journaled horizontally within the gate structure in conventional manner and carries the operating handle 42 in fixed rotational relation adjacent one side edge of the gate. A second handle may be provided adjacent the opposite side edge of the gate. Crank members 44 and 46 are fixedly mounted on the opposite ends of shaft 40 and are typically partially enclosed by the respective channel members 58 which form the vertical side edges of the gate. The two pivot pins 48 at each crank member are typically diametrically opposite each other and at equal radii from shaft axis 41, as shown best in FIGS. 2 and 3.

In gate locking position of the mechanism, with handle 42 extending vertically downward as in FIG. 1, the pins are all projected. The upper pins then engage locking apertures 26 in the gate supporting rails 12 and 14 and the lower pins engage locking apertures 25 in the rails 24, which are set into the floor of the compartment. When handle 42 is raised approximately to horizontal position, all pins are withdrawn from their locking apertures, and the gate is free to be rolled along the supporting rails.

In accordance with the present invention as illustratively shown, each of the crank members 44 and 46 is formed with a portion 50 of sector shape. Sector 50 carries on its periphery a series of rack teeth 52 which form an arcuate rack formation 54 coaxial with the shaft axis. That formation preferably extends about the shaft axis through an angle of at least 45° to 60° and typically includes from three to about six teeth, four teeth being shown illustratively.

Access to a portion of rack 50 is provided by a window 56 suitably placed in the side flange 57 of the channel member 58 that forms the side edge of the gate. A fulcrum edge is provided at the lower edge of window 56 and preferably substantially in the plane of that window. As typically shown, the fulcrum edge is formed by fixedly mounting the fulcrum plate 60 flatly against the inner face of channel flange 57, as by the rivets 61. A window is formed at 62 in fulcrum plate 60 generally registering with flange window 56, and the lower edge of window 62 is bent outwardly as shown clearly in FIGS. 2 and 3 to form the horizontal fulcrum edge 66. The metal adjacent that edge is suitably heat treated to provide combined hardness and tensile strength.

The pitch radius 68 of rack 54 is such that the rack can freely rotate within channel flange 57 and fulcrum plate 60 with the rack teeth passing at a selected distance behind fulcrum edge 66. That distance is preferably of the same order, and may be approximately equal to, the pitch of the rack teeth. That pitch is made sufficiently large that the working edge of a conventional crowbar can be fully inserted between the rack teeth, as shown clearly at 64 in FIGS. 2 and 3. The teeth are preferably unsymmetrical with the downwardly facing working side face more nearly radial than the upper face. Prying action against the lower tooth face then does not tend to cam the crowbar out of engagement.

The described mechanism provides a satisfactorily high mechanical advantage, multiplying by a large factor the force that can be exerted on the pins by the conventional handle. That factor is due primarily to the ratio of pitch radius 68 to the distance from fulcrum 66 to the rack teeth. However, that ratio is further increased by the longer lever arm of a conventional crowbar, as compared to the handle usually provided on a gate. A large mechanical advantage also results from the circular movement of pivots 48 from dead center as the pins are withdrawn from fully projected position. That advantage applies equally, to be sure, in operation of handle 42, but would not be available if conventional prying action were to be exerted directly on the pins themselves.

I claim:

1. In combination with a load dividing gate that is suspended for movement between working positions in a vehicle lading compartment and that includes locking mechanism for releasably locking the gate in a selected position, said locking mechanism including at least one pin mounted on the gate for movement into and out of engagement with a selected one of a series of locking formations fixed relative to the compartment, a shaft journaled on the gate, a crank member coupling the shaft to the pin, and handle means for normally rotating the shaft to drive the pin in its said movement; the gate being subject to lateral force exerted by a load and tending to frictionally resist release of the pin from the locking formation; mechanism for manually exerting abnormal force on the locking mechanism to cause its release in presence of such load generated friction, comprising rack structure rotatively fixed with respect to the shaft and including an arcuate series of rack teeth coaxial with the shaft, and fulcrum structure fixedly mounted on the gate and forming a fulcrum edge parallel to the shaft and radially spaced from the rack teeth by a distance of the same order as the pitch of the rack teeth, said fulcrum edge being accessible to a manual tool for prying successive teeth of the rack to progressively rotate the crank member and thereby force the locking pin out of engagement with the locking formation despite said load generated friction.

2. Mechanism as defined in claim 1, and in which
said crank member includes a portion of sector form on which the rack structure is integrally formed.

3. Mechanism as defined in claim 1, and in which
said rack structure is formed integrally on said crank member,
and said fulcrum structure comprises a fulcrum plate fixedly mounted on the gate parallel to the plane thereof and having an aperture in position to provide access to the rack, an edge portion of the aperture forming said fulcrum edge.

4. Mechanism as defined in claim 1, and in which
each of the teeth of said rack has a working side face that is more nearly radial with respect to the shaft axis than the opposite side face.

5. In combination with a load dividing gate that is suspended for movement between working positions in a vehicle lading compartment and that includes locking mechanism for releasably locking the gate in a selected position, said locking mechanism including four pins mounted on the gate adjacent the respective corners thereof for vertical movement into and out of engagement with respective locking formations fixed relative to the compartment, a shaft journaled on a horizontal axis on the gate, crank members fixedly mounted on the shaft adjacent its respective ends, link mechanism coupling two of the pins to each crank member, and handle means for normally rotating the shaft to drive the pins in their said movement; the gate being subject to lateral force exerted by a load and tending to frictionally resist release of the pins from their locking formations; mechanism for manually exerting abnormal force on the locking mechanism for manually exerting abnormal force on the locking mechanism to cause its release in presence of such load generated friction, comprising rack structure integrally formed on at least one of the crank members and including an arcuate series of rack teeth coaxial with the shaft axis, a fulcrum plate fixedly mounted on the gate substantially in the plane of one face of the gate and opposite the rack, an aperture in the fulcrum plate in position to provide access to the rack teeth, and structure at the lower edge of the aperture forming an upwardly facing fulcrum edge parallel to the shaft and radially spaced from the rack teeth by a distance approximately equal to the pitch of the rack teeth, said fulcrum edge being accessible to a manual tool for prying successive teeth of the rack upwardly to progressively rotate the crank member and thereby force the locking pins out of engagement with their locking formation despite said load generated friction.

* * * * *